No. 849,165. PATENTED APR. 2, 1907.
A. C. SCHNEIDER.
DRIP PAN.
APPLICATION FILED DEC. 11, 1906.
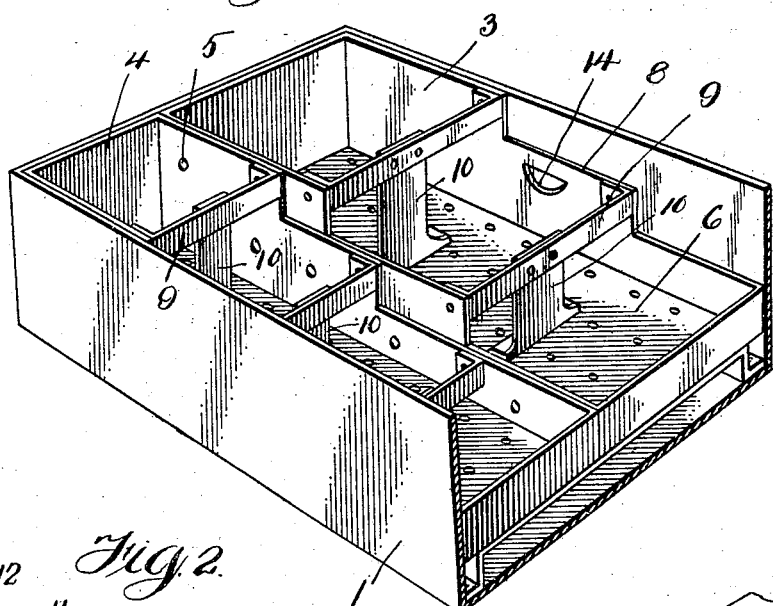
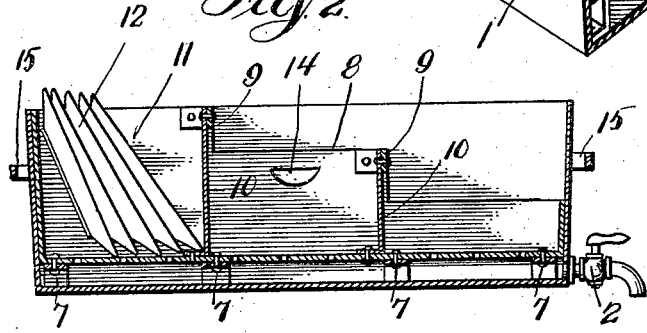
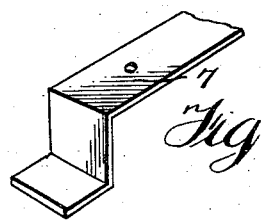
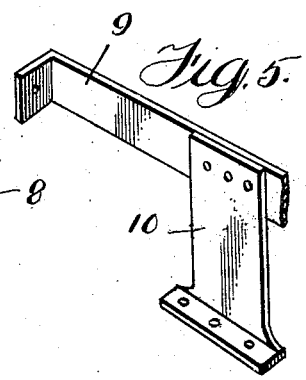
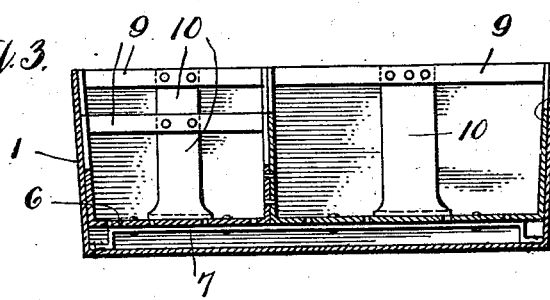

UNITED STATES PATENT OFFICE.

ANNIE C. SCHNEIDER, OF BRIDGEVILLE, PENNSYLVANIA.

DRIP-PAN.

No. 849,165.  Specification of Letters Patent.  Patented April 2, 1907.

Application filed December 11, 1906. Serial No. 347,315.

*To all whom it may concern:*

Be it known that I, ANNIE C. SCHNEIDER, a citizen of the United States of America, residing at Bridgeville, in the county of Allegheny and State of Pennsylvania, have invented certain new and useful Improvements in Drip-Pans, of which the following is a specification, reference being had therein to the accompanying drawings.

This invention relates to drip-pans, and more particularly to an improved pan for receiving the drippings of dishes placed therein.

The object of this invention is to provide a drip-pan having numerous elevated compartments to receive various sizes of dishes, the pan being provided with a faucet whereby the accumulated drippings or water in the pan can be removed at any desired time. The pan is preferably constructed in two separable parts, whereby it may be readily cleansed.

The detail construction of my improved dish-pan will be presently described and then specifically pointed out in the appended claims, and referring to the drawings forming part of this specification like numerals of reference designate corresponding parts throughout the several views, in which—

Figure 1 is a perspective view of my improved pan, partly in section. Fig. 2 is a longitudinal sectional view of the pan. Fig. 3 is a cross-sectional view of the same. Fig. 4 is a fragmentary perspective view of one of the dish-pan supports. Fig. 5 is a fragmentary perspective view of one of the dish-supporting partitions.

To put my invention into practice, I use an ordinary rectangular pan 1 and provide the end of the same adjacent to its bottom with a faucet or spigot 2, whereby the contents of the pan may be easily withdrawn.

Fitting in the pan 1 are two receptacles 3 and 4, these receptacles varying in width, but being approximately the same length. The receptacles are riveted or otherwise secured together, as at 5, and have their perforated bottoms 6 provided with depending cleats or brackets 7 to support the receptacles in an elevated position above the bottom of the pan 1.

The side walls of the receptacles 3 and 4 are cut away, as at 8, forming stepped side walls, the steps of the side walls of the receptacle 3 being of greater length than the receptacle 4, whereby larger compartments can be formed in the receptacle 3 than those in the receptacle 4. Between the stepped side walls of said receptacles are secured dish-supporting partitions consisting of straps 9, having depending legs 10. The straps 9 and legs 10 are riveted or otherwise secured to the sides of the receptacles and the perforated bottoms thereof. In subdividing the receptacles 3 and 4, I provide a plurality of compartments 11 for dishes 12, the partitions subdividing the receptacles serving to support the lower or upper edges of the dishes, preferably the lower edges, as illustrated in Fig. 2 of the drawings.

The outer side walls of the receptacles 3 and 4 are cut away to provide hand-grips 14, whereby the receptacles 3 and 4 can be easily removed from the pan 1 and in order that said pan may be easily carried I provide the ends thereof with handles 15.

In practice plates and similar large dishes are placed in the receptacle 3, while saucers, side dishes, and similar small dishes are supported in the receptacle 4, preferably upon their edges, whereby water may be poured upon the dishes and thoroughly rinse the dishes and remove any particles that may adhere to them after they have been thoroughly washed. The water as it drips from the dishes is caught in the bottom of the pan, from where it may be drained through the faucet or spigot 2.

The novel construction of my improved drip-pan permits of a large number of dishes being assembled therein and all of said dishes rinsed at the same time. The manner of supporting the dishes within the pan permits of the dishes drying without being wiped, thus saving considerable labor in the kitchen or culinary department of a residence, restaurant, or hotel.

The drip-pan is preferably constructed of light and durable metal that may be galvanized or rendered non-corrosive.

I do not care to confine myself to the size, proportion, or minor details of construction entering into my invention, as such changes as are permissible by the appended claims may be resorted to without departing from the spirit and scope of the invention.

What I claim, and desire to secure by Letters Patent, is—

1. In a drip-pan, an outer receptacle or pan, two inner drip-pans fitted within the outer receptacle or pan and being of different sizes or capacities, the said inner pans having stepped side walls, straps secured to said stepped side walls, depending feet carried by said straps resting on the bottoms of said inner pans, said straps and feet forming partitions to separate the inner pans into compartments, and means for suspending the inner pans above the bottom of the outer pan.

2. In a drip-pan, an outer pan or receptacle, an inner pan fitted therein and having a perforated bottom supported above the bottom of the outer pan, the said inner pan having stepped side walls, and straps connected to the stepped side walls separating the said inner pan into a plurality of communicating compartments.

In testimony whereof I affix my signature in the presence of two witnesses.

ANNIE C. SCHNEIDER.

Witnesses:
 MAX H. SROLOVITZ,
 H. C. EVERT.